April 7, 1970 E. ROTH 3,505,017
PROCESS FOR REMOVING PROTIUM AND TRITIUM FROM HEAVY WATER
Filed July 26, 1967 2 Sheets-Sheet 1

INVENTOR
ETIENNE ROTH
BY *William W. Stolen*
ATTORNEY

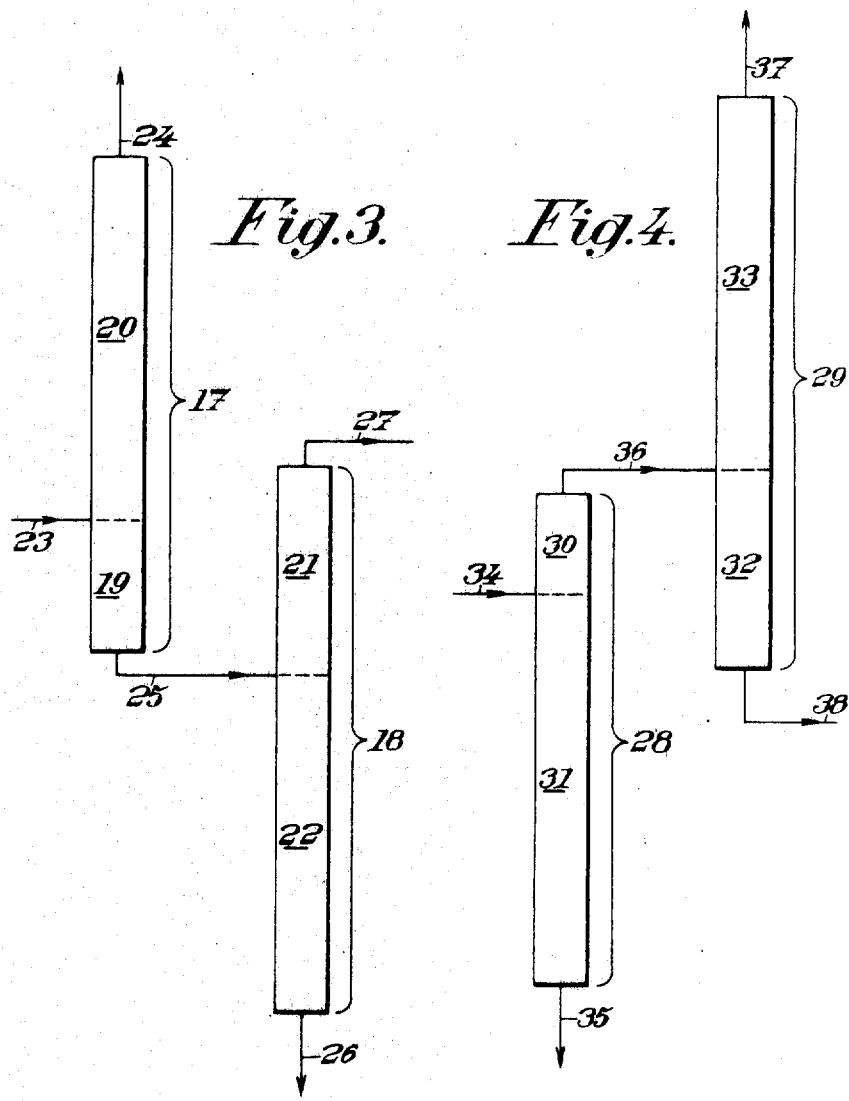

United States Patent Office 3,505,017
Patented Apr. 7, 1970

3,505,017
PROCESS FOR REMOVING PROTIUM AND TRITIUM FROM HEAVY WATER
Etienne Roth, Sevres, France, assignor to Commissariat a l'Energie Atomique, Paris, France, a French organization
Filed July 26, 1967, Ser. No. 656,179
Claims priority, application France, Aug. 9, 1966, 72,612
Int. Cl. C01b 4/00
U.S. Cl. 23—210                                5 Claims

ABSTRACT OF THE DISCLOSURE

Process and apparatus for removing protium and tritium from heavy water in service in a nuclear reactor in which a tapped fraction of the heavy water is subjected to an isotope exchange reaction with gaseous deuterium to lower its protium and tritium content. The gaseous deuterium, thus enriched in protium and tritium, is subjected to fractional distillation to remove a first part enriched in tritium and a second part enriched in protium. The gaseous deuterium, partially rid of protium and tritium, is recycled to the isotope exchange reaction.

---

Figure 2:
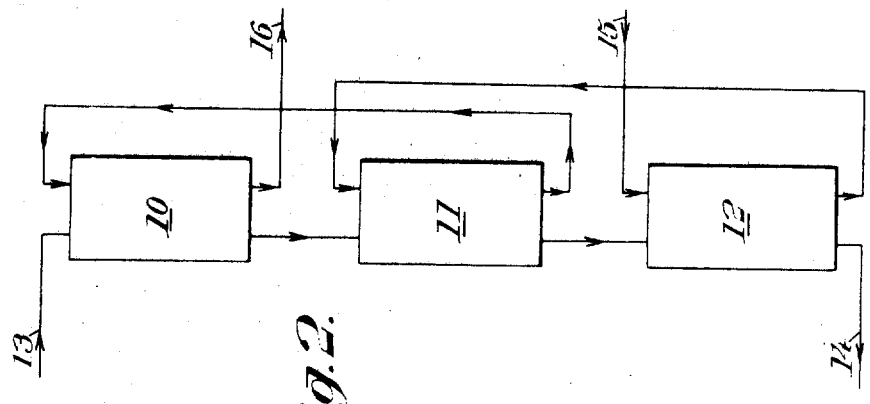

This invention relates to a process for removing protium and tritium from heavy water in service in a nuclear reactor or pile. The invention is also concerned with an apparatus for carrying out this process.

The process according to the invention is characterized by the steps of tapping the heavy water contained in the nuclear reactor or pile to form a continuous flow of tapped heavy water, subjecting this tapped fraction to an isotope exchange reaction with gaseous deuterium to lower the protium and tritium content in the tapped heavy water, removing from the gaseous deuterium, thus enriched in protium and tritium, by fractional distillation, a first part enriched in tritium and a second part enriched in protium, and recycling the deuterium partially rid of protium and tritium towards the isotope exchange reaction.

The apparatus according to the invention comprises, on the one hand, an isotope exchange reactor for partially removing, with the aid of a current of gaseous deuterium, protium and tritium from the heavy water which is continuously fed to this isotope exchange reactor, and on the other hand, a distillation installation which partially removes from the gaseous deuterium the protium and the tritium with which this gaseous deuterium was enriched by the contact with the heavy water.

The invention, in any case, will be easily understood from the following description, given merely by way of example, of particular embodiments of the invention, with reference to the accompanying drawings in which:

FIGURES 1 to 4 show schematically the principal parts of the apparatus.

The use of heavy water $D_2O$, as moderator or as thermal transfer fluid in nuclear reactors, is very advantageous with respect to the use of light water $H_2O$ by reason of its much smaller effective neutron absorption cross-section. The use of heavy water thus opens the way to fuels using natural or only slightly enriched uranium.

However, heavy water can exchange very easily its atoms of deuterium against atoms of hydrogen belonging to various substances, such as water vapour, which come into contact with the heavy water. Thus it is practically impossible to avoid the progressive introduction of light water into the heavy water during industrial exploitation of a reactor. This isotope pollution of the heavy water results in a costly decrease in the reactivity of the pile. To give some idea of the magnitudes involved, 50 kg. of light water per year can be introduced into a reactor containing from 50 to 100 metric tons of heavy water.

Moreover, the action of the neutrons on the atoms of deuterium produces, by a nuclear reaction $(n, \gamma)$, atoms of tritium T, so that at the end of only a few weeks, the tolerable dose of tritium in the heavy water is reached. In a power reactor containing 80 metric tons of $D_2O$ and having a neutron flux of the order of $5 \times 10^{13} n/cm.^3/s.$, the equivalent of about ten liters of gaseous tritium (measured at normal conditions) can be formed per month, that is to say about 10 to 20 milliliters of tritium oxide or "tritium water." Beyond the tolerable dose, there are serious risks for the health of the users of the pile during manipulations of the heavy water or due to the existence of leaks, so that it is indispensable to take costly precautions.

In order to rid the heavy water of the light water which accumulates, fractional distillation has already been used. However, by reason of the extremely small separation factor (of the order of 1.04) existing between the heavy water and the light water (which, at the small concentrations in question is in the form HDO), it is necessary to use a considerable number of stages each of which performs an elementary separation.

In the case of tritium water, the separation factor is still smaller (of the order of 1.01), so that the extraction of the tritium water by fractional distillation would be very complicated.

Thus, generally the tritium water is allowed to accumulate until it reaches "saturation," that is to say the concentration at which the speed of disappearance of the tritium, due to its radioactive decay, is equal to its speed of formation. However, the "saturation" corresponds to a concentration several times greater than the concentration compatible with the conditions of safety.

In order to mitigate these disadvantages, according to the invention, the heavy water contained in the nuclear reactor or the like is tapped to form a continuous flow of tapped heavy water, the tapped fraction is subjected to an isotope exchange reaction with gaseous deuterium to lower the protium and tritium content in this tapped heavy water, the gaseous deuterium thus enriched in protium and tritium is subjected to fractional distillation to remove a first part enriched in tritium and a second part enriched in protium, and the deuterium partially rid of its tritium and protium is recycled towards the isotope exchange reaction.

In the course of the isotope exchange process, the two principal reactions, known in themselves, are the following:

$$(HDO)+(D_2) \rightleftharpoons (D_2O)+(HD)$$

$$(TDO)+(D_2) \rightleftharpoons (D_2O)+(TD)$$

It is known that the respective equilibrium constants of these two reactions, namely:

$$K_1 = \frac{[D_2O] \times [HD]}{[HDO] \times [D_2]}$$

and $$K_2 = \frac{[D_2O] \times [TD]}{[TDO] \times [D_2]}$$

are practically equal, in the range of concentrations envisaged, to the separation factors which are defined as follows:

$$\alpha_1 = \frac{\text{atomic concentration of H in the deuterium}}{\text{atomic concentration of H in the heavy water}}$$

$$\alpha_2 = \frac{\text{atomic concentration of T in the deuterium}}{\text{atomic concentration of T in the heavy water}}$$

It is also known that the values $\alpha_1$ and $\alpha_2$ are different from 1, $\alpha_1$ being always greater than unity whereas $\alpha_2$ is always less than unity; this signifies that during the establishment of the equilibrium of the gaseous deuterium and the heavy water containing small quantities of protium and tritium, the gaseous deuterium is richer in protium and poorer in tritium than the heavy water. Besides, knowing that the separation factors in general approach unity when the temperature, at which the isotope exchange equilibrium is established increases, it can be seen that by increasing the temperature, the two equilibriums are acted upon in opposite senses.

The possibility is thus available, by acting on the temperature of the isotope exchange reaction, to favour at will the transfer of one of the isotopes, towards the deuterium to the detriment of the transfer of the other. In other words, the transfer of tritium is favoured by raising the temperature, and the transfer of protium is favoured by lowering the temperature.

To start and to accelerate the isotope exchange reaction (which does not have a tendency to take place spontaneously), one can either use solid catalysts such as, for example, platinum or palladium or an inert support, iron oxide, or nickel deposited on chromium oxide, or use thermal activation.

It can be seen that the choice between these two solutions depends not only on economic considerations but also on the temperature zone in which it is desired to operate to eliminate preferentially one or the other of the isotopes, taking into account the foregoing; the choice also depends on the respective speeds of introduction of the two isotopes into the heavy water in service in the nuclear pile.

To give some idea of the magnitudes involved, it is pointed out that with the aid of the above mentioned catalysts, temperatures of the order of 80 to 400° C. can be used, whereas by using only thermal activation, this temperature must be raised to about 800 to 1200° C. In this latter case, the reaction can be favoured by increasing the surface of contact of the gas with the walls, for example with the aid of inert filling materials.

Figure 1:
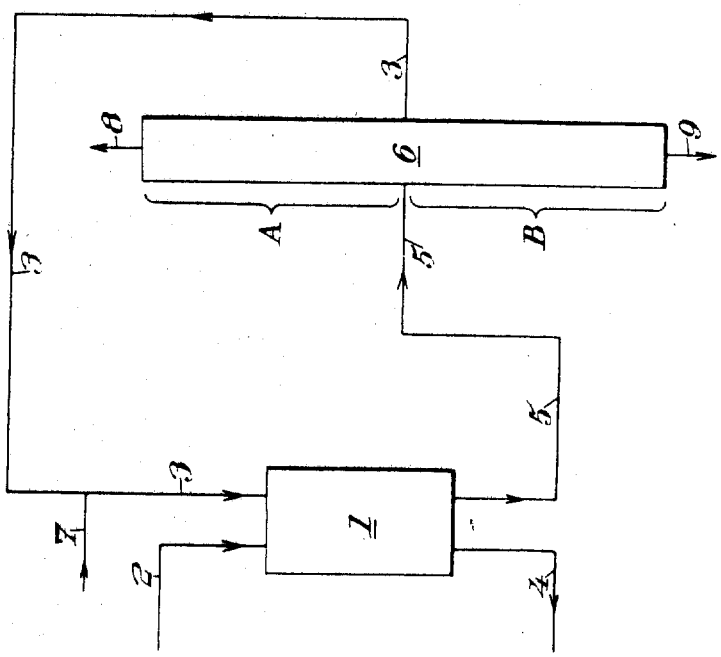

For carrying out this process, the apparatus represented schematically in FIGURE 1 can be used. This apparatus comprises an isotope exchange reactor 1, known in itself (for example of the co-current type), towards which the heavy water, continuously extracted from the pile, is directed by a conduit 2, after having been vapourized and rid of the gases which it contains in solution by means of known devices, not shown. It should be noted that the term "heavy water" is used in the present specification and claims in a general sense to designate deuterium oxide ($D_2O$), together with its "impurities" protium oxide ($H_2O$) and tritium oxide ($T_2O$), without any consideration of whether this heavy water is in the liquid state or in the vapor state.

To this same isotope exchange reactor is brought, by a conduit 3, some gaseous deuterium; the heavy water is partially rid, on contact with the gaseous deuterium, of the protium and tritium which it contains. At the outlet of the isotope exchange reactor, the heavy water, whose protium and tritium content has been lowered, is recycled towards the pile by a conduit 4 after having been condensed.

For its part, the deuterium, whose protium and tritium content has been increased, is directed by a conduit 5, after drying and liquefaction by means of known devices (not shown), towards a fractional distillation installation 6, for example of the type used for the distillation of liquid hydrogen.

With regard to this distillation installation 6, it can comprise towers provided with plates or with filling material. In the case represented schematically in FIGURE 1, a single tower forming two parts A and B has been used, but it is understood that two distinct towers can be used.

By means of the illustrated installations, a small quantity of deuterium considerably enriched in protium is continuously extracted in the upper part A, and a small quantity of deuterium considerably enriched in tritium is continuously extracted in the lower part B. The respective lengths of the parts A and B governs the concentration of the products which are extracted.

Most of the deuterium, which is thus partially rid of the protium and tritium which it contained, leaves the installation 6 by a conduit, which, in the case of the present embodiment, is none other than the above mentioned conduit 3, in order to be brought back to the reactor 1. In FIGURE 1, the inlet conduit 5 for the deuterium, enriched in protium and tritium, has been shown at the same level as the outlet conduit 3. However, it is possible to place the conduit 3 at another level which depends on the relative speeds of extraction desired for the protium and tritium. It will be noted that by placing the level of the conduit 3 above the level of the conduit 5, the extraction of tritium is favoured to the detriment of the extraction of protium, and vice-versa.

It is understood that, in order to compensate the loss of deuterium caused by the loss of the quantities extracted in the installation 6, a continuous supply of fresh deuterium should be provided, for example by a conduit 7. This fresh deuterium can be the deuterium which is formed by radiolysis in the interior of the pile and which is purified before use.

The two fractions of deuterium, respectively enriched in protium and tritium, and respectively withdrawn at the top (by a conduit 8) and at the bottom (by a conduit 9) of the installation 6, can evidently be treated in their turn by a known isotope enrichment process, with a view to the recuperation of a part of the heavy water in the first case, and with a view to the extraction of a part of the tritium in the second case. The deuterium enriched in tritium can also be preserved, possibly after transformation into heavy water, until the partial disappearance of the tritium by radioactive decay.

In the case of the apparatus schematically represented in FIGURE 2, the isotope exchange reactor 1 has been replaced by an assembly comprising three stages 10, 11 and 12 in series. The vapourized heavy water arrives at the stage 10 by a conduit 13, then passes through the stages 11 and 12, and then returns to the pile by a conduit 14. The deuterium, for its part, arrives from the distillation installation (not shown, but analogous to the installation 6 of the previous apparatus) by a conduit 15 (analogous to the conduit 3 of the apparatus of FIGURE 1) and enters into an isotope exchange reaction with the heavy water successively in the stages 12, 11 and 10 (following the path shown in FIGURE 2) then returns toward the distillation installation by a conduit 16. The counter-current contact thus achieved improves the efficiency of the exchange.

Just as in the case of the apparatus represented in FIGURE 1, the devices for condensing the heavy water and for re-evaporating it at the inlet and at the outlet of the assembly of stages 10, 11 and 12 or between these stages have not been shown.

Other arrangements could also be envisaged for the circulation. For example, the apparatus could be arranged so that the deuterium flows through the three stages 10, 11 and 12 in series, and the heavy water flows through these three stages in parallel, or vice-versa.

In the case where it is desired to favour more particularly the extraction of protium, in preference to the extraction of tritium, the apparatus can be arranged so that the counter-current isotope exchange takes place in a reactor or tower provided alternately with bubble plates (on which the "liquid heavy water"-"vapour heavy water" exchange takes place) and catalyst beds (on which the "vapour heavy water"-"gas" exchange takes place). This method has been described by Frank T. Barr in U.S. Patent No. 2,676,875. In this case, by reason of the presence of the liquid heavy water, the reaction is limited to a low temperature zone, of the order of 100 to 150° C.

It has already been mentioned above, in the description of the apparatus of FIGURE 1, that the extraction of tritium would be improved by placing the conduit 3 above the conduit 5, but that the extraction of protium would be simultaneously decreased, and vice-versa.

To remedy this disadvantage, the distillation installation 6 can be replaced, as shown in FIGURE 3, by two distinct distillation towers 17 and 18 each having an enrichment section and an impoverishment section (namely sections 19 and 20 respectively for the tower 17 and sections 21 and 22 respectively for the tower 18).

Thus, the deuterium charged with protium and tritium coming from the isotope exchange reactor (not shown in FIGURE 3) is introduced by a conduit 23 into the tower 17. At the top of the impoverishment section 20 of the tower 17, a small quantity of deuterium considerably enriched in protium is withdrawn through a conduit 24, and at the bottom of the enrichment section 19 of the tower 17 the largest part of the deuterium partially rid of protium but still containing practically all of the tritium is withdrawn through a conduit 25. This deuterium is introduced into the tower 18 as visible in FIGURE 3, and at the bottom of the impoverishment section 22 of this tower a small quantity of deuterium considerably enriched in tritium is withdrawn through a conduit 26, whereas at the top of the enrichment section 21 of the tower 18 the largest part of the deuterium which is partially rid of the protium and tritium is withdrawn through a conduit 27, which, in the case of the present embodiment, is none other than the conduit 3 of FIGURE 1. This deuterium is recycled to the isotope exchange reactor.

In order to achieve first of all the separation of tritium and then the separation of protium (as opposed to the previous embodiment), the apparatus schematically shown in FIGURE 4 can be used, this apparatus being also intended to replace the distillation installation 6 of FIGURE 1.

This apparatus comprises two towers, namely the towers 28 and 29, comprising respectively an enrichment section and an impoverishment section (30 and 31 for the tower 28, and 32 and 33 for the tower 29).

The deuterium coming from the isotope exchange reactor (not shown) is introduced by a conduit 34 into the tower 28. At the bottom of the impoverishment section 31 a small quantity of deuterium considerably enriched in tritium is obtained through a conduit 35, and at the top of the enrichment section 30, the largest part of the deuterium partially rid of its tritium but still containing practically all the protium is withdrawn through a conduit 36. The deuterium withdrawn through the conduit 36 is introduced into the tower 29. At the top of the impoverishment section 33, a small quantity of deuterium considerably enriched in protium is withdrawn through a conduit 37, whereas at the bottom of the enrichment section 32 the largest part of the deuterium partially rid both of the tritium and of the protium is withdrawn through a conduit 38 (which, in the present embodiment, is none other than the conduit 3 of FIGURE 1). The deuterium in the conduit 38 (3) is recycled to the isotope exchange reactor.

As a result, the present invention provides a process and various embodiments of an apparatus for carrying out this process whose characteristics are sufficiently apparent from the foregoing that it is unnecessary to dwell on this point. The process and apparatus of the invention have various advantages with respect to the prior art, notably with regard to efficiency.

The invention is not limited to the specific examples given above, but includes various modifications.

What I claim is:

1. Process for removing protium and tritium from heavy water in service in a nuclear reactor, which heavy water tends to accumulate protium and tritium during operation of the nuclear reactor, comprising the steps of:

tapping the heavy water contained in the nuclear reactor to form a continuous flow of tapped heavy water;

subjecting said tapped heavy water to an isotope exchange reaction with gaseous deuterium to lower the protium and tritium content in the tapped heavy water by exchanging protium and tritium isotopes contained in the tapped heavy water for deuterium isotope;

recycling the tapped heavy water, whose protium and tritium content has thus been lowered, to the nuclear reactor;

removing from the gaseous deuterium, thus enriched in protium and tritium, by fractional distillation, a first part enriched in tritium and a second part enriched in protium;

and recycling the deuterium partially rid of protium and tritium to said isotope exchange reaction.

2. Process according to claim 1 in which said isotope exchange reaction is carried out at a temperature of from 800° to 1200° C.

3. Process according to claim 1 in which said isotope exchange reaction is carried out at a temperature of from 80° to 400° C. in the presence of a suitable solid catalyst.

4. Process according to claim 3 in which said catalyst belong to the group consisting of platinum on an inert support, palladium on an inert support, iron oxide, and nickel deposited on chromium oxide.

5. Process according to claim 1 in which the extraction of tritium is favoured by raising the temperature of the isotope exchange reaction and the extraction of protium is favoured by lowering this temperature.

References Cited

UNITED STATES PATENTS

| 2,908,554 | 10/1959 | Hoogschagen | 23—210 |
| 2,927,003 | 3/1960 | Becker | 23—211 |
| 3,087,791 | 4/1963 | Becker | 23—211 XR |
| 3,216,800 | 11/1965 | Stouls | 23—212 |

FOREIGN PATENTS

| 825,934 | 12/1959 | Great Britain. |
| 826,128 | 12/1959 | Great Britain. |
| 1,008,475 | 10/1965 | Great Britain. |

OTHER REFERENCES

Heslop & Robinson book: "Inorganic Chemistry," second revised edition, 1963, pp. 214 and 215. Elsevier Publishing Co., New York and London.

EDWARD STERN, Primary Examiner

U.S. Cl. X.R.

23—204, 211, 263